Nov. 9, 1971  D. F. FITZNER  3,618,443
SNAP-IN GASKET HOLDER
Filed July 15, 1969

INVENTOR
DONALD F. FITZNER

By Baldwin Wight Diller & Brown

ATTORNEYS

United States Patent Office 3,618,443
Patented Nov. 9, 1971

3,618,443
SNAP-IN GASKET HOLDER
Donald F. Fitzner, 6361 Isleta Blvd. SW.,
Albuquerque, N. Mex. 87105
Filed July 15, 1969, Ser. No. 841,874
Int. Cl. F16b 19/00
U.S. Cl. 85—5                                                1 Claim

ABSTRACT OF THE DISCLOSURE

This disclosure relates to a gasket holder which is useable to hold a gasket in place relative to a machine element by being passed through a bolt receiving opening in the gasket and being snapped into the internally threaded bore into which the bolt is to be threaded. A principal feature of the holder is the resilient construction thereof which permits it to be readily snapped into place and wherein, when released, it will retain its position. A further feature of the holder is the useability of a single holder for several sizes of bolts.

---

This invention relates in general to new and useful improvements in fasteners, and more particularly to a snap-in type fastener particularly adapted to hold in place gaskets until associated components are assembled and bolts and like fasteners are passed through the gaskets and the components.

In numerous assemblies of components including gaskets, the components are arranged so that when gaskets are disposed in positions other than horizontal overlying a supporting surface with the result that difficulties are experienced in retaining the gaskets in place while the components are being assembled. Typical examples of such difficulties are found with respect to automobiles, particularly the engines thereof. When assembling components such as fuel pumps, water pumps, carburetors, timing gear covers, transmission pans, oil pans, etc., the proper positioning of the gasket at times is extremely difficult and time consuming. This is also true of many other types of machinery, including household appliances.

In accordance with this invention it is proposed to solve the problem of retaining a gasket in place prior to the complete assembling of the components which are sealed by the gaskets by holding the gaskets in place by means of retainers or holders which are received in the fastener receiving openings and through which the fasteners may be readily passed without interference. By utilizing such holders or retainers, a gasket may be firmly anchored to a machine component and held in place against slippage, after which the next component to be assembled may be readily positioned in the normal manner as though the gasket were not there, followed by the securement of the component in place by means of fasteners, such as bolts, which pass not only through the component and the gasket, but also pass through the retainer.

One of the principal features of this invention is the provision of a retainer for holding a gasket in place by the passage of the retainer through the usual bolt aperture in the gasket and forcing a body portion of the retainer into the usual bolt hole of the machine part, the holder or retainer being of a resilient and radially compressible construction whereby it may be readily snapped into place and is self-retaining in position.

Another feature of this invention is the formation of the retainer with a gasket retaining flange at one end thereof and a thread engageable ridge at the opposite end thereof whereby a positive interlock within a threaded bore is obtained thereby firmly holding the retainer and an associated gasket in place.

A further feature of this invention is the provision of a snap-in gasket holder or retainer wherein the body thereof is formed of a relatively thin material which is readily deformable whereby a bolt may be passed through the retainer and into an internally threaded opening with the retainer being deformed between the threads of the opening and the fastener and serving to lock the fastener in place.

A still further feature of the retainer is that the body thereof is of a split and resilient construction whereby in addition to being readily snapped into place within a threaded opening, the retainer may be readily adaptable to different sizes of threaded openings so as to be useable with a range of bolt sizes.

With the above and other objects in view that will hereinafter appear, the nature of the invention will be more clearly understood by reference to the following detailed description, the appended claim and the several views illustrated in the accompanying drawing.

Figure 1:
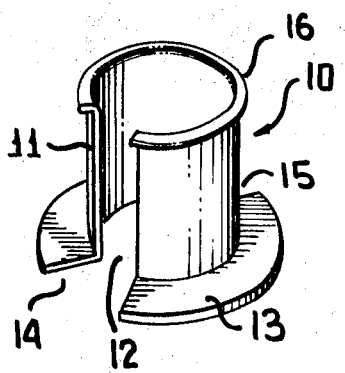
FIG. 1 is a top perspective view of the snap-in gasket holder or retainer.
Figure 2:
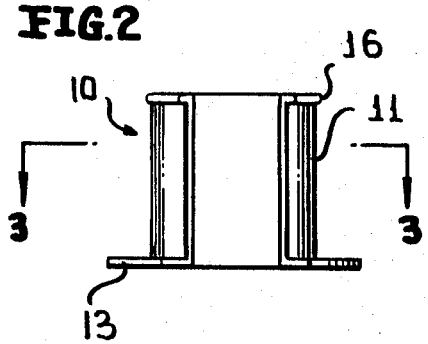
FIG. 2 is an elevational view of the retainer.
Figure 5:
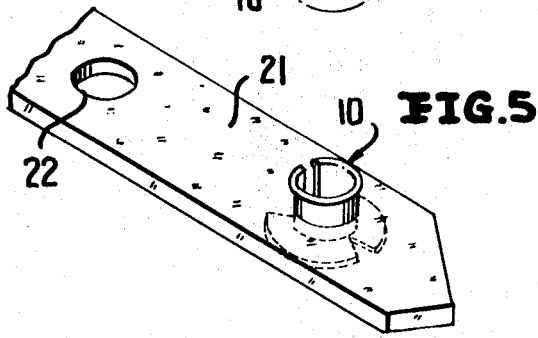
FIG. 5 is an enlargement of an end portion of the gasket of FIG. 4 and shows the specific relationship between a retainer and the gasket.
Figure 3:
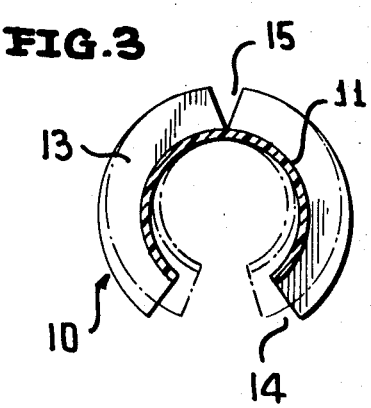
FIG. 3 is a horizontal sectional view of the retainer taken along the line 3—3 of FIG. 2 and schematically shows the manner in which the retainer may be resiliently compressed to reduce the effective diameter thereof.

Referring now to the drawings in detail, it will be seen that there is illustrated in FIGS. 1, 2 and 3 the snap-in gasket holder or retainer which is the subject of this invention, the retainer being identified by the numeral 10. The retainer 10 is of a one-piece construction and includes a cylindrical body 11. The body 11 is broadly C-shaped in cross section, as is illustrated in FIG. 3, and accordingly, it may be said that the body 11 is provided with a longitudinally extending, circumferential interruption as at 12.

At one end the body 11 is provided with an article or gasket supporting flange 13 which is circumferentially co-extensive therewith and having a notch 14 therein aligned with the interruption 12. In order to facilitate the flexing and reduction in effective diameter of the body 11 in the manner to be described hereinafter, it may also be desirable to provide the flange 13 with a further notch 15 which is preferably disposed diametrically remote from the notch 14.

The retainer 10 further includes an external ridge or bead 16 at the opposite end thereof. The bead 16 is very narrow as compared to the flange 13.

At this time it is pointed out that the retainer 10 may be formed of a variety of materials, although it is preferred that it be formed of a suitable plastic which has sufficient elasticity or resiliency so as to normally attempt to return to its original shape. It is also preferred that the retainer 10 be formed of a relatively thin material with the body 11 having a wall thickness on the order of 0.003 inch to 0.015 inch.

Figure 4:
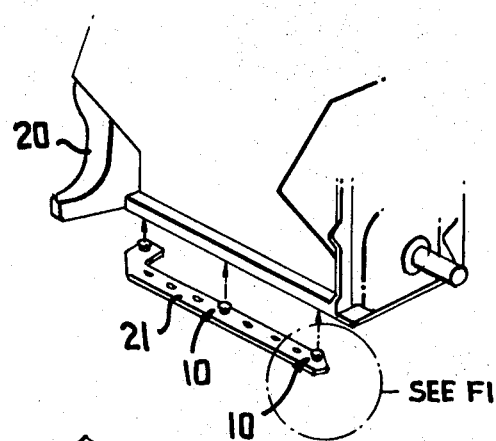
FIG. 4 is a schematic perspective view showing generally how an oil pan gasket may be secured to the undersurface of an engine block utilizing the retainers.

Referring now to FIG. 4 in particular, it will be seen that there is illustrated a typical use of the retainer 10. In FIG. 4 there is illustrated a conventional internal combustion engine block 20 which normally has the lower portion thereof closed by an oil pan. The oil pan is sealed relative to the block 20 by means of a gasket 21. When the block 20 is disposed in its normal upright position, it is extremely difficult to secure a pan thereto with the gasket being properly alinged. In the past this has been accomplished by numerous manners including tying loops of string or thread around the lip of the pan and the gasket. This, obviously, is time consumnig and is undesirable in that the string must be removed after the pan is loosely secured in place.

Figure 6:
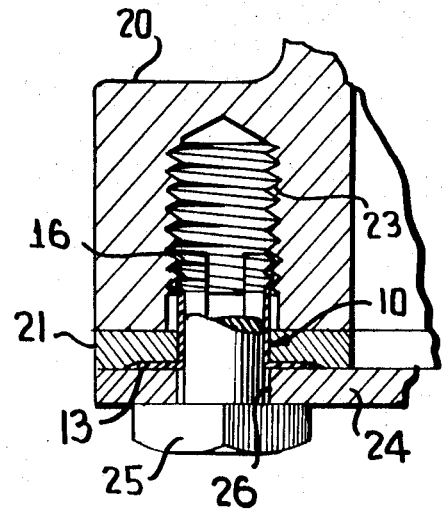
FIG. 6 is a fragmentary vertical sectional view with the proportions of parts being exaggerated and certain of the parts being broken away and shows an assembled oil pan utilizing one of the retainers.

In accordance with this invention, an oil pan gasket, such as the gasket 21, is positioned relative to the underside of the block 20 and is progressively secured in place by use of the retainers 10. Since the body 11 of each retainer 10 has a diameter greater than the bolt hole formed in the block for the pan bolt, it is necessary to squeeze the retainer to a collapsed position, such as that shown in phantom lines in FIG. 3. The retainer 10 is then passed through a bolt hole 22 in the gasket 21 and up into the associated internally threaded bolt hole 23 (FIG. 6) in the block 20. Inasmuch as the retainer 10 is of a resilient construction, it will be readily apparent that it will snap in place in the bolt hole 23 and will be retained therein, if for no other reason, by the frictional compressive engagement with the walls of the bolt hole. However, it is to be noted that the ridge 16 at the upper end of the body 11 is particularly adapted to be interlocked with the internal threads of the bolt hole 23 so as to provide for a positive interlock between the retainer 10 and the block 20.

It is to be understood that as many retainers 10 as is necessary to properly hold the gasket 21 in place will be used. It is not always necessary to provide one retainer for each bolt hole in the gasket. This, of course, is a matter of discretion.

With the gasket 21 firmly temporarily anchored on the underside of the block 20 by means of a plurality of the retainers 10, the flange 13 of each retainer 10 holding the gasket 21 in place, the oil pan, which is identified by the numeral 24, may then be conveniently positioned beneath the block and moved up into aligned engagement with the gasket 21. Thereafter, securing bolts 25 are passed through bolt holes 26 in the oil pan 24, up through the gasket 21 and the associated retainers 10 and are threaded into the threaded bolt holes 23 of the block 20. Although the wall thickness of the retainer 10 has been exaggerated for purposes of clarity in FIG. 6, it is to be understood that due to the very thin wall thickness, on the order of 0.003 inch to 0.015 inch, actually the retainer will occupy very little space within the bolt hole 23. Thus, the bolt 25 may be readily pressed into place and then threaded into the threads of the bolt hole 23.

It is also particularly pointed out at this time that since the retainer 10 is preferably formed of a suitable plastic, it will be readily deformed by the interengagement between threads of the bolt 25 and the threads of the bolt hole 23 so that the retainer will also serve to effect the locking of the bolt 25 in place.

In view of the fact that the gasket 21 is loosely secured against the block 20 prior to the positioning of the oil pan 24, it will be apparent that it is not necessary to utilize the usual sealants used by many mechanics in order to assure both a proper seal and the proper positioning of the gasket. Also, it is to be understood that the material of the retainer 10 is such that sticking thereof to the metal components will not occur. Accordingly, when it is desired to move the oil pan 24 at a later date, the gasket 21 may be readily stripped therefrom and the retainers readily removed therewith except for the loose particles. These particles will be readily blown from the bolt hole 23 and brushed from the bolt 25.

Although the retainer has been specifically illustrated and described in use with an oil pan gasket, it is to be understood that the invention is in no way to be so limited. The retainer may be utilized for holding any thin member in place until the necessary fasteners are applied. This would even apply to instances where for example sheet metal parts are being applied but it is not convenient to hold them in place manually until some other part is being attached.

Although only a preferred embodiment of the retainer has been specifically illustrated and described herein, it is to be understood that minor modifications may be made in the retainer construction without departing from the spirit of the invention.

I claim:

1. A retainer particularly adapted for association with an opening for holding a member in place relative to the opening prior to the passage of a fastener through the member and into the opening, said retainer comprising a generally cylindrical body having a longitudinally extending circumferential interruption whereby said body may be readily circumferentially collapsed for insertion within an opening, said body being formed of a resilient material whereby the tendency of said body to return to its original configuration will facilitate the retention of said body in an opening, and said body having an article supporting flange at one end thereof, said article supporting flange being notched in direct and diametrical alignment with said body interruption with said article supporting flange notch extending entirely to said body, and said body having a retainer retaining ridge at the opposite ends thereof extending substantially between said circumferential interruption, said retainer retaining flange being narrow as compared to said article supporting flange and being adapted to interlock with a thread when said retainer is associated with a threaded opening.

References Cited

UNITED STATES PATENTS

| | | | |
|---|---|---|---|
| 2,639,832 | 5/1953 | Bergström | 151—69 UX |
| 2,745,521 | 5/1956 | White | 287—189.36 D |
| 3,156,281 | 11/1964 | Demi | 151—69 X |

DAVID J. WILLIAMOWSWY, Primary Examiner

W. L. SHEDD, Assistant Examiner

U.S. Cl. X.R.

287—126, 110; 85—80